United States Patent Office 2,935,515
Patented May 3, 1960

2,935,515
ANTISPASMODIC

Clifford E. Larrabee, New London, Conn., assignor to Chas. Pfizer & Co., Inc., Brooklyn, N.Y., a corporation of Delaware No Drawing. Application December 7, 1956
Serial No. 626,829

4 Claims. (Cl. 260—326.5)

This invention is concerned with new and valuable antispasmodic agents. It is also concerned with a method for their preparation and with methods for their administration.

A variety of compounds have been prepared which have antispasmodic activity. Many of these have drawbacks in that they possess a number of side effects in addition to the main effect of muscular relaxation. The novel compounds of this invention include $\alpha[\beta'-(2''-$methyl-1''-azaspiro[4.5]decyl)ethyl]-benzhydrol and the acid addition salts thereof. [The nomenclature system used in this application and in the appended claims is in conformance with the system preferred by Chemical Abstracts as described in the subject index of Volume 39, (1945)]. Benzhydrol free base and the pharmaceutically acceptable acid addition salts which it forms with pharmaceutically acceptable acids, either organic or inorganic, are useful for administration to animals to induce muscular relaxation and to decrease or end muscular spasms. These compounds are particularly valuable since they possess little or none of the anti-cholingeric and gastric antisecretory activity often possessed by similar compounds. Salts with toxic acid are of value for isolation of the product in solid form. These may be converted to the pure base and in turn to other salts.

The novel products of the present invention are prepared from 2-methyl-1-azaspiro[4.5]decane. The preparation of this starting material is described in copending application Serial No. 626,830, filed December 7, 1956, now abandoned. In brief, 2-methyl-1-azaspiro [4.5] decane is prepared by contacting nitrocyclohexane with methyl vinyl ketone in a lower alkanol solvent in the presence of an alkaline catalyst at such a rate that the temperature remains below 100° C. to produce 1-(1'-nitrocyclohexyl)-butan-3-one which is in turn contacted with hydrogen in the presence of a nickel catalyst at a temperature of from about 50° C. to 120° C. at a pressure of from about 100 p.s.i. to 1000 p.s.i.

In preparing a product of the present invention 2-methyl-1-azaspiro[4.5]decane is condensed with an acrylic acid ester. Although esters prepared from higher alkanols, for example, up to about ten carbon atoms can be utilized, it is generally preferred to use esters prepared from the lower alkanols such as methanol, ethanol, isopropanol, butanol and pentanol, since these alkanols are more readily available commercially. The product that is produced by this reaction is an ester of β-(2-methyl-1-azaspiro[4.5]decyl) propionic acid. The ester is then converted to a tertiary carbinol. This can be accomplished using the Grignard reaction but better yields are obtained using an alkali metal phenyl compound, preferably phenyl lithium. The tertiary carbinol that is obtained from this reaction is in the form of a base and it may be converted into an acid addition salt by treatment with an organic or inorganic acid. The process of this invention is outlined diagrammatically below.

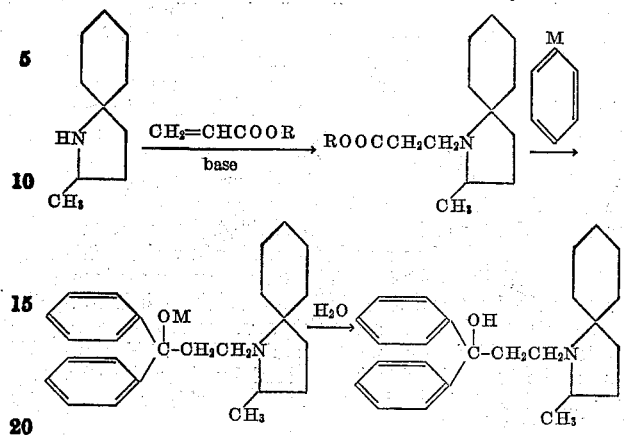

In the above formulas R is preferably a lower alkyl and M is an alkali metal preferably lithium.

In conducting the preparation of the valuable compounds of the present invention, 2-methyl-1-azaspiro [4.5] decane is condensed in an inert polar organic solvent with an acrylic acid ester. The lower alkanols, particularly ethanol, are especially useful as solvents for conducting the process. It is preferred to heat the reaction mixture and to add the acrylic acid ester gradually with agitation of the solvent. In general, at least about one mole of the acrylate is used per mole azaspirodecane. An excess is helpful, however, not more than three moles of the acrylates should be used since there is a tendency for the acrylate to polymerize. Too large an excess of the acrylate will give undesirably high proportions of polymerized material thus making it more difficult to isolate a pure condensation product. If the azaspirodecane is added to the acrylate there is a tendency for the acrylate to polymerize with itself rather than to react with azaspirodecane. This, of course, tends to decrease the yield of desired condensation product.

The reaction is conducted at a temperature of from about 40 to 120° C., and if a low boiling solvent (not >120° C.) is used, the reaction mixture is preferably refluxed. Although some product is formed in a shorter time, optimum yields are obtained if reaction is carried out for a period of from about three hours to about sixteen hours. The product is recovered by evaporating the solvent and distilling the crude material. The ester reaction product is hydrolyzable (e.g. by dilute alkali) to the corresponding carboxylic acid which, of course, is esterifiable with other alcohols.

In carrying out the condensation described above the presence of an organic or inorganic basic catalyst is sometimes helpful. Included among the useful catalysts are such compounds as sodium hydroxide, potassium hydroxide, lithium hydroxide, barium hydroxide, tetramethylammonium hydroxide, benzyltrimethylammonium hydroxide, choline and other similar organic and inorganic bases.

In the preferred process for the preparation of the novel compounds of this invention at least about two moles of the phenyl-alkali metal compound is condensed with the ester prepared as described above. The phenyl-alkali metal compound is preferably the lithium compound and this may, for instance, be prepared in situ from bromobenzene and lithium in an inert organic solvent. The condensation with the ester is also conducted in an inert organic solvent. Such solvents as lower aliphatic ethers, for example, diethyl ether, diisopropyl ether, dibutyl ether, etc. are particularly valuable. Aromatic hydrocarbons, aliphatic hydrocarbons or cycloalkanes may also be used as solvents. An excellent yield of product may be obtained by simply allowing the reaction mixture to stand for a period of about sixteen hours at room temperature. Alternatively the reaction may be hastened by refluxing in which case a reflux period of about three hours is generally effective. Thus the reaction may be carried out at a temperature of from about 20° C. to about 100° C. for a period of from about three to about sixteen hours. The active base of this invention is formed by careful addition of water to the intermediate metallic compound. An excess of water is added, and the tertiary carbinol dissolves in the water-immiscible solvent. The layers are separated and the organic solution washed with water to remove any alkali metal hydroxide, and then distilled. The product is generally obtained as a dark viscous liquid which often at least partially solidifies. The base may be purified, for example, by recrystallization. Alternatively it is converted to a salt by treatment with aqueous acid or with anhydrous acid in an inert organic solvent. For instance, the hydrochloride is prepared by dissolving the base in ether and treating the solution with hydrogen chloride gas.

The products of this invention are, as indicated above, particularly useful since they are potent antispasmodic compounds. This may be readily demonstrated by standard pharmacological tests in which it has been shown that these compounds are very effective in diminishing or abolishing spasms induced in muscles by barium chloride solution. In addition to the antispasmodic activity this substance, which is most readily utilized in the form of a water soluble salt of a pharmaceutically acceptable organic or inorganic acid also possess coronary dilating activity, vasodilatory effects and diuretic effects. A further advantage of the compounds of the present invention is that they do not possess gastric anti-secretory activity. Thus they may be administered orally to animals particularly man and are effective in decreasing or abolishing gastric or intestinal spasms without causing any disarrangement of the digestive mechanism due to suppression of the normal secretions of the gastric mucosa. In administering products of this invention as antispasmodic a dosage of from about 0.1 to 1.0 mg. of the free base is administered per kg. of body weight. If the compounds are administered as pharmaceutically acceptable acid addition salts, the amount of salt which must be administered to obtain this optimum dosage range of the free base is readily calculable from a knowledge of the molecular weight of the pharmaceutically acceptable acid. Thus, a higher dosage of a pharmaceutically acceptable acid addition salt prepared from a high molecular weight acid will be necessary compared to the dosage which will be administered with pharmaceutically acceptable acid addition salts prepared from low molecular weight acids. The effect will vary somewhat with species of animal and route of administration. In general, the route of administration is dictated from the particular type of muscle spasm which it is desired to control as indicated above. Oral administration is the preferred route when the gastrointestinal tract is involved.

The following is an illustration of the unusually high level of anti-spasmodic activity of the compounds of the present invention. The effect of the azaspirodecane hydrochloride upon contractions of the dog's bladder was measured in female dogs under sodium pentobarbitol anesthesia. The dogs were catheterized with a Borden 5 cc. retention catheter which was connected to a Sanborn electro manometer to record changes in bladder pressure. The pelvic nerve connected to the bladder was isolated and stimulated to a grass stimulator. Stimulation was performed at two minute intervals until two or three equal contractions were obtained. The hydrochloride of the antispasmodic base was administered at dosages of 125 and 250 mcg./kg. of body weight by the intravenous route. This caused an inhibition of the contractions of from 40 to 97%. By way of comparison papaverine when administered at a level of 1 mg./kg. of body weight of the intravenous route caused 79 to 86% inhibition of contractions. Thus it is seen that the compound is appreciably more effective than the papaverine as an antispasmodic.

As an indication of the diuretic effect of the compounds of this invention the hydrochloride was administered orally to rats at a level of 60 mg./kg. of body weight and produced diuretic effect over a test period of five hours comparable to that produced by the known diuretic mictine.

Among the therapeutically acceptable acids which may be used for the preparation of salts of the antispasmodic base of this invention are the following: hydrochloric, hydrobromic, hydriodic, sulfuric, nitric, phosphoric, citric, acetic, propionic, tartaric, fumaric, maleic, gluconic, saccharic, benzoic, salicylic and other similar acids. As indicated above these may be readily formed in either aqueous or organic solvent solution. In general at least about one equivalent of the pharmaceutically acceptable acid is used per mole of the antispasmodic base.

The compounds of this invention may be administered alone or in combination with pharmaceutically acceptable carriers the proportions of which are determined by the suitability and chemical nature of the particular carrier, the chosen route of administration and standard pharmaceutical practice. They may be administered orally in the form of tablets or capsules containing such excipients as starch, milk sugar, certain types of clay, etc. For parenteral administration they may be used in the form of a sterile solution containing other solutes, for example, enough saline or glucose to make the solution isotonic.

The following examples are given solely for the purpose of illustration and are not to be construed as limitations of this invention, many variations of which are possible without departing from the spirit or scope thereof.

EXAMPLE I

*Ethyl-β-(2-methyl-1-azaspiro[4.5]decyl) propionate*

A mixture of 500 ml. absolute ethanol, 2 ml. 50% aqueous choline and 153.3 g. (1.00 mole) 2-methyl-1-azaspiro[4.5]decane is heated to reflux and 200.2 g. (2.00 moles) ethyl acrylate added from a dropping funnel at such a rate as to keep the reaction under control. After the addition of ethyl acrylate is completed the mixture is stirred and refluxed for about fifteen hours. The solvent is removed by distillation at the water pump and steam bath and the dark brown residue liquid transferred to a distillation flask and distilled at reduced pressure. In this way 196.9 g. (77.7%) of ethyl-β-(2-methyl-1-azaspiro [4.5]decyl) propionate, B.P. 105/0.2–112/0.4 and $n_D^{24.5}$ 1.4755–1.4761 is obtained. A sample of B.P. 104/0.07 mm. and $n_D^{25}$ 1.4759 analyses as follows.

*Analysis.*—Calc'd. for $C_{15}H_{27}NO_2$ (253.37): Calc'd., C, 71.10; H, 10.74; N, 5.53. Found, C, 71.22; H, 10.84; N, 5.44.

EXAMPLE II

*Amyl β-(2-methyl-1-azaspiro[4.5]decyl) propionate*

A mixture of 500 ml. absolute ethanol and 153.3 g. (1.00 mole) 2-methyl-1-azaspiro[4.5]decane is heated to reflux and 284 g. (2 moles) amyl acrylate is added from a dropping funnel at such a rate as to keep the reaction under control. After the addition of amyl acrylate is complete the mixture is stirred and refluxed for about sixteen hours. The solvent is removed by distillation at the water pump and steam bath and the desired product recovered by distillation under reduced pressure.

EXAMPLE III

α-[β'-(2''-methyl-1''-azaspiro[4.5]decyl) ethyl]benzhydrol

Two liters of dry ether are placed in a round bottom flask equipped with a stirrer, a thermometer and a condenser to which a drying tube is attached. Lithium wire (55.5 g.–8.0 g. atom) is cut into short lengths and added to the ether. Bromobenzene (628 g.–4.0 moles) is added from a dropping funnel at such a rate that refluxing of the ether is kept under control. The mixture is then stirred until all the lithium reacts, whereupon 253.4 g. (1.0 mole) of ethyl β-(2-methyl-1-azaspiro[4.5]decyl) propionate is added from a dropping funnel during a period of about three hours. The reaction is exothermic and the ester must be added slowly to keep it under control. The resulting mixture is allowed to stand at room temperature for about sixteen hours. One liter of water is added slowly and the resulting layers separated. The ether layer is washed with water and the ether removed by distillation. The residual product is recrystallized from hexane to give colorless needles, M.P. 121.0 to 122.0° C.

Analyses.—Calc'd. for: $C_{25}H_{33}NO$ (259.00): Calc'd., C, 82.82; H, 9.22; N, 3.99. Found, C, 82.60; H, 9.15; N, 3.85.

EXAMPLE IV

α-[β'-(2''-methyl-1''-azaspiro[4.5]decyl) ethyl]-benzhydrol

Two liters of petroleum ether (40–60° C.) are placed in a round bottom flask equipped with a stirrer, a thermometer and a condenser to which a drying tube is attached. Lithium wire (8.0 g. atom) is cut into short lengths and added to the solvent. Bromobenzene (4.0 mole) is added from a dropping funnel at such a rate that refluxing is kept under control. The mixture is then stirred until all the lithium reacts, whereupon 1.0 mole of amyl β-(2-methyl-1-azaspiro[4.5]decyl) propionate is added from a dropping funnel during a period of about three hours. The reaction is exothermic and the ester must be added slowly to keep it under control. The resulting mixture is refluxed for five hours. The solution is cooled, 1 liter of water is added slowly and the resulting layers separated. The organic layer was washed with water and the solvent removed by distillation. The residual product is recrystallized from hexane to give colorless needles, M.P. 121.0 to 122.0° C.

EXAMPLE V

α-[β'-(2''-methyl-1''-azaspiro[4.5]decyl) ethyl]benzhydrol hydrochloride

An ether solution containing α-[β'-(2''-methyl-1''-azaspiro[4.5]decyl) ethyl]-benzhydrol is saturated with dry hydrogen chloride gas whereupon the acid addition salt precipitates and is collected by filtration. The salt is air dried and recrystallized from acetonitrile and ether. It melts with decomposition at 237.8–238.4° C.

Analysis.—Calc'd. for $C_{25}H_{34}NOCl$ (399.99): Calc'd, C, 75.06; H, 8.57; N, 3.50; Cl−, 8.86. Found, C, 74.88; H, 8.65; N, 3.62; Cl−, 8.92.

EXAMPLE VI

α-[β'-(2''-methyl-1''-azaspiro[4.5]decyl) ethyl]benzhydrol citrate

An ether solution containing α-[β'-(2''-methyl-1''-azaspiro[4.5]decyl) ethyl]benzhydrol is treated with an equimolar ethanol solution of citric acid. The solvent is removed by distillation and the product recovered.

What is claimed is:

1. A process for the preparation of an acid salt of α-[β'-(2''-methyl-1''azaspiro[4.5]decyl) ethyl]benzhydrol which comprises contacting a lower alkyl β-(2-methyl-1-azaspiro[4.5]decyl) propionic acid ester wherein the lower alkyl group of said ester contains up to five carbon atoms with phenyl lithium in a reaction inert organic solvent for a period of about one hour to about sixteen hours at a temperature of from about 20° C. to about 100° C. and contacting resulting α-[β'-(2''-methyl-1''-azaspiro[4.5]decyl) ethyl]benzhydrol with an acid.

2. A compound chosen from the group consisting of α-[β'-(2''-methyl-1''-azaspiro[4.5]decyl) ethyl]benzhydrol and the acid salts thereof.

3. The process of producing β-(2-methyl-1-azaspiro[4.5]decyl) propionic acid ester which comprises contacting 1 mole of 2-methyl-1-azaspiro[4.5]decane with from 1 to 3 moles of acrylic acid ester of the formula $CH_2=CHCOOR$ wherein R is alkyl containing up to 5 carbon atoms in a reaction inert polar organic solvent at a temperature of from about 40° C. to about 120° C. for a period of from about 3 to about 16 hours and then recovering resulting β-(2-methyl-1-azaspiro[4.5]decyl) propionic acid ester.

4. The process of producing β-(2-methyl-1-azaspiro[4.5]decyl) propionic acid ester which comprises adding acrylic acid ester of the formula $CH_2=CHCOOR$ wherein R is alkyl containing up to 5 carbon atoms to 2-methyl-1-azaspiro[4.5]decane in a reaction inert polar organic solvent at a rate maintaining the temperature from about 40° C. to about 120° C., maintaining resulting reaction mixtures within said temperature range for from about 3 to about 16 hours and then recovering resulting β-(2-methyl-1-azaspiro[4.5]decyl) propionic acid ester.

References Cited in the file of this patent

UNITED STATES PATENTS 2,814,622   Moffett _____ Nov. 26, 1957

OTHER REFERENCES

Moffett: J. Org. Chem., vol. 14, p. 865 (1949).